Figure 1:
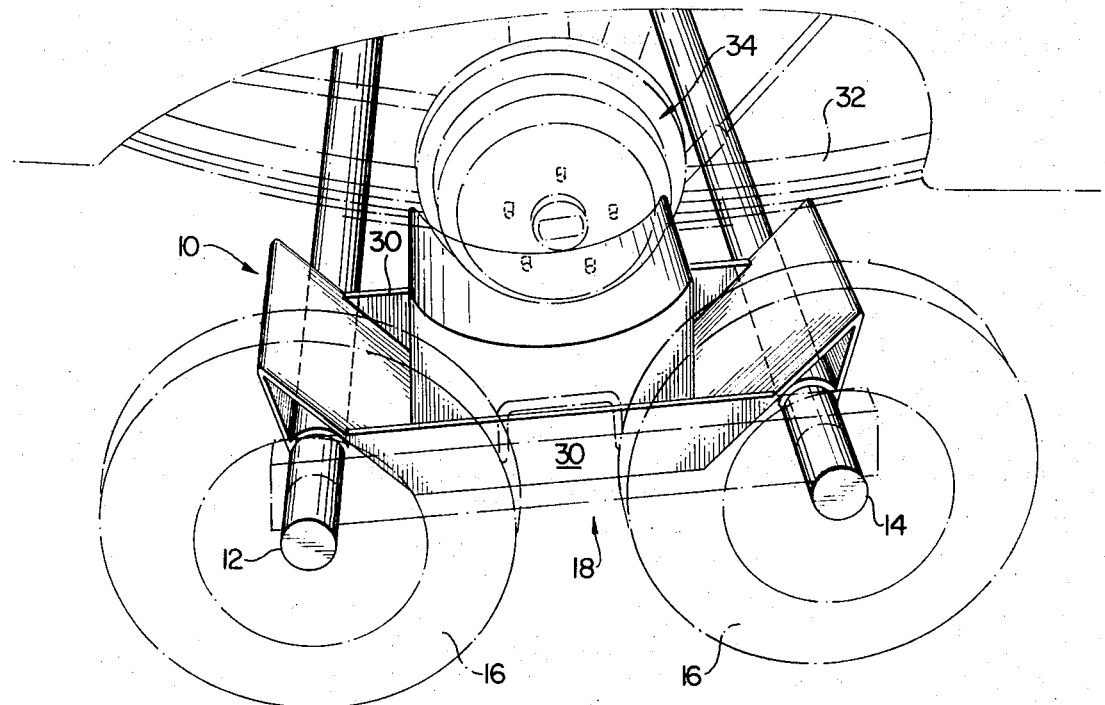

United States Patent [19]
Sapp, Sr.

[11] 3,756,616
[45] Sept. 4, 1973

[54] DOLLY BLOCK
[76] Inventor: William C. Sapp, Sr., 306 Coastal Hwy., Port Wentworth, Ga. 31407
[22] Filed: Mar. 1, 1972
[21] Appl. No.: 230,881

[52] U.S. Cl. .............................. 280/79.1, 248/352
[51] Int. Cl. ............................................. B62b 5/00
[58] Field of Search ....................... 280/47.15, 79.1, 280/35, 14; 214/330, 331, 334; 248/119 R, 352

[56] References Cited
UNITED STATES PATENTS

| | | | |
|---|---|---|---|
| 1,379,773 | 5/1921 | Miller | 248/119 R |
| 2,943,863 | 7/1960 | Corey et al. | 214/330 X |
| 1,154,287 | 9/1915 | Butcher | 280/47.15 |
| 1,257,942 | 2/1918 | Cottle | 280/47.15 |
| 1,459,511 | 6/1923 | McComas | 248/119 R |

*Primary Examiner*—Leo Friaglia
*Assistant Examiner*—John A. Pekar
*Attorney*—David H. Semmes

[57] ABSTRACT

A dolly block for selective association with a wheel dolly of a conventional type adapted to support wheels of a vehicle for towing purposes and the like, the conventional dolly being selectively modified by use of the dolly block to support an automobile wheel drum when the tire and wheel are disassociated from the drum. The modified support eliminates the necessity for a vehicle leaf spring resting on a dolly pan and enables moving of an automobile even though the tire and/or wheel have been removed.

2 Claims, 2 Drawing Figures

DOLLY BLOCK

BACKGROUND OF THE INVENTION

Heretofore conventional dollies consisting of, for example, four wheel dollies have been used to support vehicles through coaction with and support of the vehicle wheels including, at times, tires in operable condition. Under some circumstances however such vehicle tires and/or wheels have been removed from a vehicle to be towed or otherwise damaged and when such a vehicle is associated with a conventional, for example, four wheel dolly for towing of the vehicle, the vehicle leaf spring rests on the supporting pan of the dolly which prevents the drum from resting in the bottom of the pan in a restricted condition and will permit the vehicle to shift and result in possible pan and/or vehicle spring damage. Under such circumstances optimum and easy pulling of a vehicle is not possible.

The present invention overcomes this defect by providing a supplemental support for a vehicle drum.

SUMMARY OF THE INVENTION

The dolly block of the invention is adapted for selective association with conventional four wheel dollies or the like which support vehicle wheels for towing purposes by a tow vehicle. Such conventional wheel dollies have generally dish shaped concave pans in which vehicle wheels are placed and the vehicle being towed is movably supported by means of the wheeled dolly. Such dollies are normally designed and configured to support an entire vehicle wheel and tire. Under certain circumstances however vehicle wheels and/or tires are disassociated from the vehicle and vehicle support on the dolly then resides in leaf spring engagement with upper portions of the dolly pan and/or haphazard drum engagement with the pan. With the drum lacking in relatively fixed bottom and longitudinal support in the pan of the dolly the vehicle can shift and damage the dolly pan and/or vehicle springs when the vehicle is towed. The dolly block of the invention is mountable selectively in the dolly pan and is provided with a concave rest which firmly supports a vehicle drum with the leaf spring or the like of the vehicle maintained out of engagement with the pan and eliminating the aforementioned difficulties.

Figure 2:
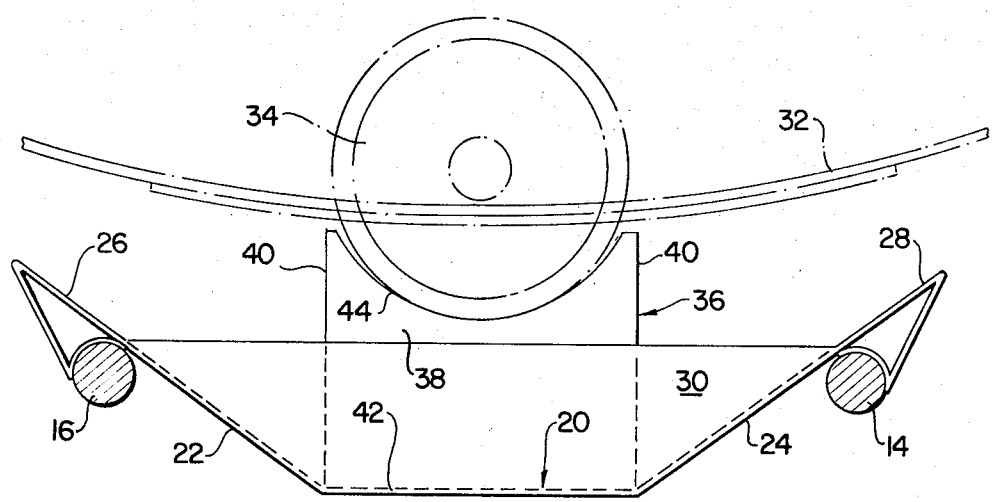

Other objects and advantages of the invention will be more readily apparent from the following detailed description of an embodiment thereof when taken together with the accompanying drawings in which:

FIG. 1 is a perspective view of a four wheeled dolly mounting the dolly block of the present invention in a vehicle hub support position; and FIG. 2 is a side elevational view of the invention disclosed in FIG. 1 with the dolly wheels omitted for clarity.

Referring now to the drawings a conventional four wheel dolly for towing vehicles is indicated generally at 10 which normally includes front and rear axles 12 and 14 having wheels and tires 18 operatively mounted thereon. While only two such wheels 16 are shown, the conventional dollies include such support wheels at either side thereof in a four wheel arrangement and the dollies are adapted to support two wheels of a vehicle to be towed, either front or rear.

The dollies include a support pan generally indicated at 18 mounted on and spanning the distance between axles 12 and 14. The laterally spaced support pans are of a generally dish shaped concave configuration as shown in FIG. 2 and include a flat central base portion 20 and upwardly angularly disposed front and rear portions 22 and 24 respectively terminating in axle associating and mounting front and rear ends 26 and 28. The pans also include upstanding side walls 30 which, as seen, coact with the remainder of the pan structure to confine and retain wheels mounted therein.

Referring to the figures of the drawing, a towed vehicle spring 32 and a wheel hub 34 are schematically shown. The dimensions of the conventional dolly pan are such that with a vehicle wheel removed the springs 32 will rest on the upper edge extremities of the front and rear pan ends with the hub 34 in suspended position. This is due to the dimensions and configuration of the pan being correlated with a vehicle wheel including tire for support. Accordingly with a vehicle wheel and tire removed there is no positive confinement or restriction of movement due to interengagement of the springs with the top edges of the pan and the vertical suspension of the hub in spaced relation with the bottom of the pan.

The dolly block of the present invention overcomes and eliminates this problem and as seen the block 36 which consists preferably of a light weight material including side walls 38 and front and rear walls 40 forming a box shape with a flat configured bottom portion 42 which can be open and preferably of dimensions commensurate with those of flat central base portion 20 of the pan for confined or restricted engagement in and therewith to prevent respective movement when associated as shown in the drawings. A top wall 44 is affixed to the upper edges of the sides and front and rear walls and has a dished concave configuration of dimensions and configuration for coaction with vehicle hubs. The dimensions and configuration can be such as to accommodate different size vehicle hubs with the curve being such as to accommodate it to a confining action for a hub 34 positioned therein. The dimensions and shapes of the dolly block with respect to those of the pan and the hubs are such as to remove contact between the springs and the pan and insure a firm support for the hub in the pan and resultant optimum moving or towing conditions of a vehicle when so mounted.

Manifestly minor changes in details can be effected without departing from the spirit and scope of the invention as defined in and limited solely by the appended claims.

I claim:

1. A vehicle tow dolly comprising:
    A. laterally spaced and interconnected vehicle wheel support pans having pan support wheels operatively mounted thereon;
    B. said pans respectively having rectangular shaped vehicle wheel support recesses including:
        i. a flat base portion; and
        ii. upwardly inclined fore and aft end portions extending from said base portion;
    C. selectively removable dolly blocks mountable in and supportable by said support recesses, including:
        i. upstanding walls forming a rectangle;
        ii. said rectangle having a flat base portion defined by the lower edges of said walls and of size and dimensions commensurate with the base of said recessed pan for restricted movement, placement and support therein;

iii. a vehicle wheel hub engaging and supporting top on said rectangle; and

D. said blocks, when mounted in said recesses, serving to support vehicle wheel hubs thereon with vehicle suspension springs being out of engagement with said pan.

2. A dolly block as claimed in claim 1, said upstanding walls including front, rear and side walls forming a rectangular shaped box, said side walls having concave shaped upper edges and said top comprising a plate of dished concave configuration connected between said side walls and constituting said vehicle hub engaging and supporting top.

* * * * *